Patented Dec. 15, 1953

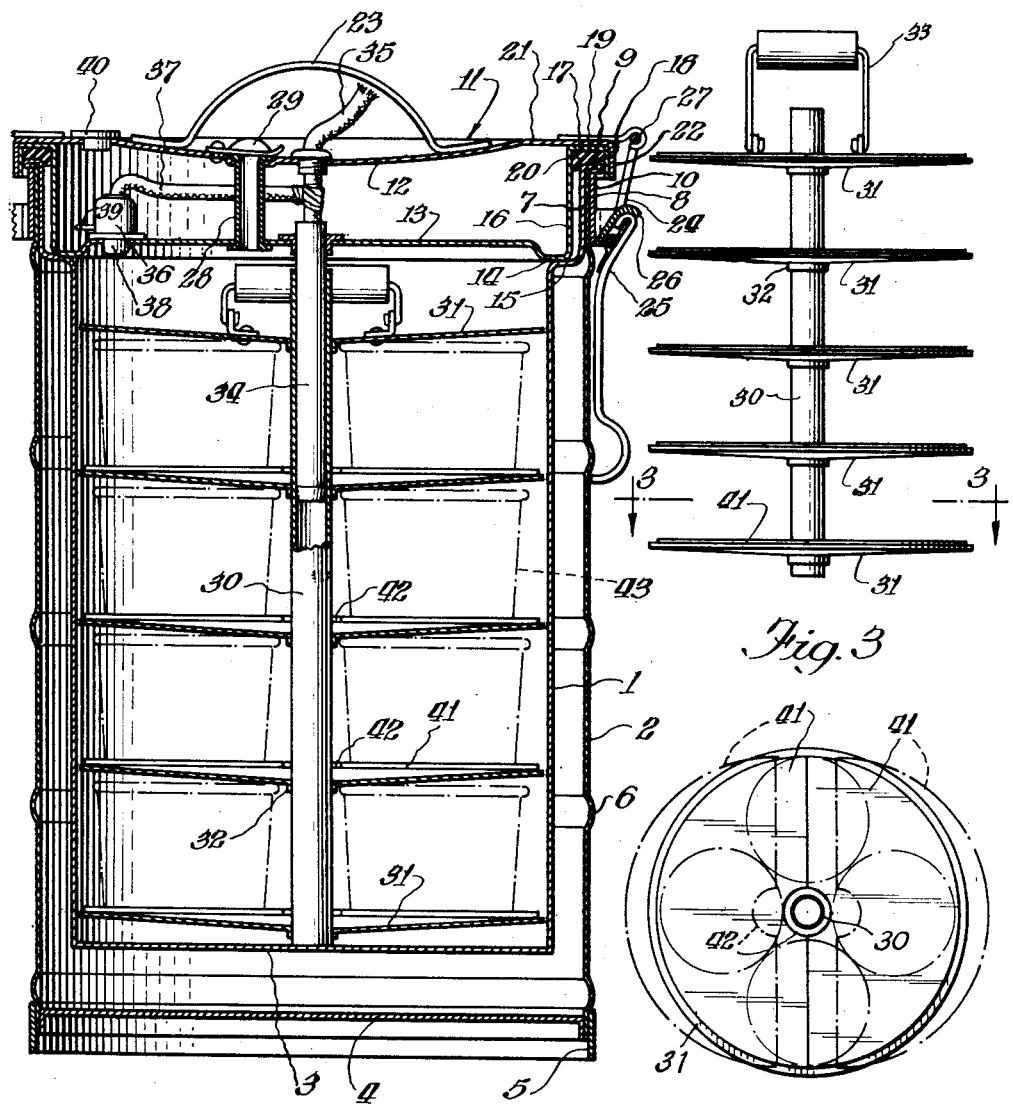

2,662,965

UNITED STATES PATENT OFFICE 2,662,965

PORTABLE FOOD CONTAINER

Glenn C. Becker, Chicago, Ill., assignor to Vacuum Can Company, Chicago, Ill., a corporation of Illinois Application September 26, 1950, Serial No. 186,868

4 Claims. (Cl. 219—35)

1

This invention relates to improvements in a portable food container and more specifically to an improvement in an insulated container which is primarily designed for the delivery of hot food products in individually packaged servings (for example, hot potato salad, beef stew, etc.) to individual consumers in various places such as shops and gatherings of large numbers of people where there may be a demand for such service.

Vacuum and otherwise insulated containers have long been used for the purpose of delivering food and other products in either chilled or heated condition to a place remote from the place of preparation of the products and although such containers are quite efficient and have given considerable satisfaction, they are not completely satisfactory especially for the purpose of delivering heated products to the consumer if there is a prolonged time interval between preparation and packaging, and delivery to the consumer.

The main object of the present invention is to provide a container of the character indicated which will have the known attributes of an insulated container and which will also embody means whereby heat lost from the container may be replaced, thereby to maintain the temperature of the product much nearer to the desired serving temperature, even after an extended period of time between initial packaging and serving or distribution; and to provide an arrangement in which the desired initial temperature may be effectively maintained throughout extended waiting or storage periods so that when the container is started on its round of product distribution the product is at the desired high temperature so that it will reach the consumer in a most satisfactory condition.

Other objects and advantages of the invention will be understood by reference to the following specification and accompanying drawing.

In the drawing,

Figure 1 is a vertical cross section through a cylindrical container embodying a selected form of the invention;

Figure 2 is a side elevation of a rack structure which supports packaged food or other material in vertically separated tiers within the container; and Figure 3 is a plan section on the line 3—3 of Figure 2.

The container structure shown in Figure 1 comprises a receptacle having a side wall structure formed of inner and outer mutually spaced cylindrical walls 1 and 2, and mutually spaced inner and outer bottom walls 3 and 4. The

2 inner wall 1 and bottom wall 3 may be rigidly interconnected as by means of welding, and the outer side wall 2 and bottom wall 4 are similarly rigidly united. The outer side wall is preferably provided with a protective bottom rim 5 which depends below the lower end of the side wall 2, this rim being disposed around the outside of the lower margin of the wall 2 and welded or otherwise fixedly secured thereto. For strengthening purposes the outer wall 2 is provided with a series of outwardly pressed ribs 6.

The inner and outer containers are provided with interfitting mouth or neck portions 7 and 8, respectively, the inner neck 7 being provided with a laterally outwardly extending rim 9 which extends over the upper end of the outer neck 8. These interfitting necks 7 and 8 may be welded or otherwise secured together in an airtight joint and the space between the inner and outer containers below said neck portions may be vacuumized or packed with insulation material to thereby resist temperature changes within the inner container. The neck portion of the structure is reenforced by a neck-band 10 around the outside of the outer neck 8 and this neck-band may be welded or otherwise fastened fixedly in place on the container structure.

A cover 11 is provided for the container, this cover being hollow and formed of upper and lower cover members 12 and 13, respectively. The lower or inner member 13 is provided with a peripherally downwardly offset flange portion 14 which is adapted to seat on the laterally outwardly extending shoulder portion 15 of the inner container, said shoulder portion 15 connecting the inner wall 1 and the inner neck 7. Said inner cover member 13 is contained substantially vertically upwardly from the outer edge of the seat flange 14 as shown at 16 and at its upper end said wall portion 16 is extended laterally outwardly as at 17 and then downwardly as shown at 18 to form a recess 19 for receiving a compressible rubber or other gasket 20.

The upper or outer member 12 of the cover has its central portion dished downwardly as shown and it has a marginal portion 21 which extends outwardly and then downwardly as shown at 22 in face-to-face engagement with the portions 17 and 18, respectively, of the inner part of the cover structure. The portions of the cover members which are disposed in face-to-face engagement may be welded together or otherwise secured to maintain the parts in the required assembled relation and the joint may be made airtight to maintain a vacuum if the cover is to be vacuumized. However, the cover may be packed with suitable insulation material or merely left empty, the latter being the cover condition herein contemplated. A suitable handle 23 is secured to the cover member and a plurality of toggle or similar latches embodying links 24 and levers 25 pivoted on portions of the links for locking engagement with anchoring hooks 26 are provided. The links 24 are pivoted as indicated at 27 in ears which are secured to the cover structure and the anchoring hooks 26 are suitably fixedly secured to the re-enforcing neck band 10 of the container structure. A suitable vent tube 28 extends through the cover and a vent cap 29 is pivoted to the cover so as to be movable from closed to open relation to the vent tube 28.

The proportions of the cover and the neck part of the outer container are such that when the locking hooks 25 are engaged, the cover seat 14 will rest on the container seat 15 and the gasket 20 will be compressed between the container edge flange 9 and the cover wall portion 17. This will produce an effective seal to seal the container so that the interior condition thereof may be substantially maintained.

The rack structure shown in Figure 2 is designed to fit freely removably within the inner container structure. Said rack comprises a central tubular metallic post 30 having attached thereto a plurality of shelves 31, these shelves being disposed in vertically spaced relationship as illustrated so as to be adapted to receive between them, packaged food or other products which may accordingly be supported in the receptacle in vertically separated tiers. The post 30 and shelves 31 may be made of lightweight, thermally conducting material such as aluminum or other metal, the shelves 31 being preferably dished downwardly slightly as shown and provided with centrally apertured flanges such as indicated at 32 which may be pressed tightly against the post 30 and welded or soldered in place to not only fixedly secure the shelves to the post but also to insure good heat conductivity from the post to the shelves.

The shelves are of a diameter which, as above indicated, will fit freely within the inner receptacle side wall 1 and it is preferable that the fit be so free that there will be a very poor heat conducting contact developed between the shelves and the wall 1 of the inner container structure. It is of course preferred that the rack structure be a close enough fit to avoid significant shifting within the receptacle structure and clearance of the order of one-sixteenth of an inch around the entire circumference of the shelves will be satisfactory. This clearance may be more or less than that indicated and is not critical. A suitable lifting handle 33 is attached up to the top of the upper shelf 31 to facilitate lifting and insertion of the rack from and into the receptacle. The post 30 extends below the lowermost shelf 31 for seating on the bottom of the container, thereby to support the rack with its lowermost shelf in upwardly spaced, non-heat-conducting relation to the bottom of the container.

The cover structure 11 has an electric heating element 34 welded or otherwise suitably rigidly secured to the inner wall 13 in depending relation thereto as shown, this heating element being disposed substantially axially of the cover so that it may fit into the hollow of the tube or post 30 of the rack when the cover is in place on the container. This heating element 34 is preferably a fairly snug fit in the post 30 although it is not so snug as to prevent free removal of the cover from the container and of the heating element from the tube 30 when it is desired to gain access to the interior of the receptacle. Hence, the heating element 34 while characterized above as a snug fit in the tube 30 is nevertheless a free sliding fit, even when the parts are heated and thus expanded to their largest diameters.

The heating element 34 is supplied with electrical current from a flexible conducting cord 35 which has its free end (not shown) provided with an attachment cap which may be plugged into any suitable electrical outlet. The electric circuit to the heating element 34 also includes a thermostatic control element 36 connected by a suitable heat resistant conductor cord 37 to the heater 34 and current supply conductor 35. Said thermostat 36 is housed within the hollow interior of the cover 11 but it has a temperature pick-up portion 38 projected downwardly from the cover so as to be in direct contact with the temperature of the interior of the receptacle. This thermostat is of such form that when the temperature drops below a predetermined point, the electrical circuit to the heater 34 will be closed, and when the temperature reaches a predetermined high or maximum temperature, the electric circuit will be opened.

The thermostat 36 may be a suitable non-adjustable thermostat adapted to maintain a selected temperature within a given range in which case the hollow of the cover may be completely sealed from the atmosphere. In this instance the thermostat 36 is shown as being of an adjustable type having an adjusting lever 39. The cover is provided with a removable plug 40 in its top wall which may be removed to provide an access opening through which an instrument may be inserted for moving the lever 39 to adjust the thermostat setting. This adjustable thermostat arrangement is particularly desirable when the storage container is not to be appropriated for the handling of one kind of food or one class of products all of which are to be maintained at a temperature within the same range, but instead may be subjected to use at different times, for handling a variety of products, some of which should be maintained at a higher temperature than others.

It will be seen that when the cover with its heating element 34 is in place on the container the heating element 34 will transmit heat by radiation and by conduction, to the post 30 and the latter, by conduction, will transmit heat to the shelves 31. The post 30 and the shelves 31 will radiate heat to the space within the container so as to thereby heat whatever products are positioned on the shelves 31.

For some purposes it is preferable to provide substantially flat, horizontal supports for the food products which are to be handled in the container. For that purpose it is preferred to supply auxiliary shelf members such as represented at 41 in the form of semi-circular plates, there being a pair of such plates provided for each of the shelves 31. These semi-circular plates 41 are centrally notched as indicated at 42 to fit freely about the post, i. e., free of contact therewith, only the outer peripheral portions of these plates resting on the shelves 31 as shown. These auxiliary plates 41 are freely removable and are not essential to the use of the rack and may be omitted in some instances. However, where a container of material such as represented in broken lines at 43 contains a very moist product, i. e., one in which liquid is present in a substantial amount, the employment of the levelling plates 41 may be desirable. The shelves 31 may of course be made level but the dished arrangement shown permits the use of relatively lightweight metal and provides particularly effective heat radiation and distribution, the dished arrangement serving to impart strength against collapsing under the weight of a full charge of material on the shelves. Furthermore, the dished arrangement is desirable in most instances because it helps to keep the packaged material from sliding off the shelves even though the rack is swung or tilted to a considerable degree of angularity when removed from the container.

With the described heated container structure, a concessionaire may package a food product and place it in the insulated container many hours before the product is to be delivered to the customer. In the interim the temperature within the container may be maintained at the desired temperature and the container disconnected from a source of electric current only a few minutes before or at the time that the container is started on its rounds of distribution. Hence, the content of product may be delivered at the desired temperature to the customer.

Various changes in the described structure and in the uses therefor may be made without departing from the invention.

I claim:

1. A container of the class described comprising a receptacle, a rack removably fitting within said receptacle for supporting food or other material in vertically stacked arrangement within the receptacle, said rack having a portion provided with an axially located, vertically extending recess substantially coaxially with the vertical axis of said receptacle, a cover for closing the upper end of said receptacle, temperature control means carried by said cover, and heat disseminating means carried by said cover in depending relation thereto and adapted to enter said axial recess in said portion of the rack when the cover is in place on said receptacle, said heat disseminating means being energized by operation of said temperature control means to supply heat to the interior of the receptacle when containing said rack loaded with material.

2. A container of the class described, comprising an axially vertical receptacle having side and bottom walls and an open top, a rack removably fitting within said receptacle, said rack having a metallic post and a plurality of metal shelves secured to said post at vertically separated intervals for supporting material in vertically separated tiers in said receptacle, a hollow cover removably seatable on the upper end of said receptacle, temperature control means carried within said cover, and a heating member secured to said cover in depending relation thereto, said heating member and the upper end portion of said post having a telescopic interfitting relationship when the cover is applied to said receptacle, said heating member being energized by operation of said temperature control means to transmit heat to said post, the latter being operative to transmit heat to said shelves so as to effect distribution of heat from the upper end of the container throughout the same.

3. A container of the class described, comprising a cylindrical receptacle having side and bottom walls and an open top, a rack removably fitting within said receptacle, said rack having a metallic post and a plurality of vertically spaced circular metal shelves secured to said post for supporting material in vertically separated tiers in said receptacle, said post and shelves when in said receptacle being substantially coaxial therewith and said post having a hollow upper end portion, a hollow cover removably seatable on the upper end of said receptacle, an electric heating member secured to said cover in depending relation thereto, said heating element being positioned to enter the hollow upper end portion of said post when the cover is applied to said receptacle, thereby to transmit heat to said post, the latter being operative to transmit heat to said shelves so as to effect distribution of heat from the upper end of the container throughout the same, means for connecting said heating member to a source of electric current, and a thermostatic control element connected in the circuit of said heating member and mounted in the hollow of said cover for initiating the flow of electric current to said heating element when the temperature within said receptacle is at a predetermined minimum temperature and for stopping such flow when the temperature within said receptacle reaches a predetermined maximum temperature, said thermostatic control element having a temperature pick-up portion exposed on the inside of said cover to the interior of said receptacle so as to be affected by temperature changes therein.

4. A container according to claim 3 wherein the shelves of the rack are dished downwardly and there are provided for certain of said shelves, pairs of substantially semi-circular flat plates adapted to be positioned on the respective shelves with their peripheral portions in supporting engagement with the shelves, the central portions of said plates being notched to fit freely around said central post.

GLENN C. BECKER.

References Cited in the file of this patent

UNITED STATES PATENTS

| Number | Name | Date |
| --- | --- | --- |
| 447,678 | Gibson | Mar. 3, 1891 |
| 771,830 | Rice | Oct. 11, 1904 |
| 799,377 | Harden | Sept. 12, 1905 |
| 952,941 | Perkins | Mar. 22, 1910 |
| 1,026,334 | Vessey | May 14, 1912 |
| 1,273,821 | Causton | July 30, 1918 |
| 1,415,049 | Reichart | May 9, 1922 |
| 1,562,021 | Ziola | May 17, 1925 |
| 2,062,466 | Marr | Dec. 1, 1936 |
| 2,459,498 | Cameron | Jan. 18, 1949 |